(12) United States Patent
Leone et al.

(10) Patent No.: US 8,997,457 B2
(45) Date of Patent: Apr. 7, 2015

(54) CATALYST HEATING WITH EXHAUST BACK-PRESSURE

(75) Inventors: Thomas G. Leone, Ypsilanti, MI (US); Peter C. Moilanen, Clinton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 204 days.

(21) Appl. No.: 13/608,382

(22) Filed: Sep. 10, 2012

(65) Prior Publication Data

US 2014/0069080 A1    Mar. 13, 2014

(51) Int. Cl.
| | |
|---|---|
| F01N 3/18 | (2006.01) |
| F02D 9/04 | (2006.01) |
| F02D 13/02 | (2006.01) |
| F02D 41/00 | (2006.01) |
| F02D 41/06 | (2006.01) |
| F02M 25/07 | (2006.01) |

(52) U.S. Cl.
CPC .............. *F02D 13/0219* (2013.01); *F02D 9/04* (2013.01); *F02D 13/0207* (2013.01); *F02D 13/0265* (2013.01); *F02D 41/0055* (2013.01); *F02D 41/064* (2013.01); *F02D 2250/34* (2013.01); *F02M 25/0727* (2013.01); *F02M 25/0752* (2013.01); *F02M 25/0753* (2013.01); *Y02T 10/18* (2013.01); *Y02T 10/47* (2013.01)

(58) Field of Classification Search
CPC . F02M 25/712; F02M 25/713; F02M 25/715; F02D 9/04; F02D 9/06; F02D 2250/34; F02D 41/006; F02D 37/02
USPC .................................................. 60/278, 284
See application file for complete search history.

(56) References Cited

U.S. PATENT DOCUMENTS

| | | | |
|---|---|---|---|
| 6,381,952 B1 | 5/2002 | Asanuma et al. | |
| 6,968,677 B2 | 11/2005 | Tamura | |
| 7,210,289 B2 | 5/2007 | Sugano et | |
| 7,895,830 B2 | 3/2011 | Otsubo et al. | |
| 2006/0213482 A1 * | 9/2006 | Shibagaki et al. | ............ 123/396 |
| 2008/0209887 A1 | 9/2008 | Hanari et al. | |
| 2009/0094978 A1 * | 4/2009 | Yamagata et al. | ............. 60/602 |
| 2010/0005784 A1 | 1/2010 | Bird et al. | |

FOREIGN PATENT DOCUMENTS

| | | | | |
|---|---|---|---|---|
| JP | 2005315189 A | * | 11/2005 | ................ F01N 3/18 |
| JP | 2007056719 A | * | 3/2007 | |
| WO | 9632583 | | 10/1996 | |
| WO | 2009105463 A2 | | 8/2009 | |

OTHER PUBLICATIONS

Leone, Thomas G. et al., "Catalyst Heating with Exhaust Back-Pressure," U.S. Appl. No. 13/608,450, filed Sep. 10, 2012, 46 pages.

* cited by examiner

*Primary Examiner* — Kenneth Bomberg
*Assistant Examiner* — Jonathan Matthias
(74) *Attorney, Agent, or Firm* — Julia Voutyras; Alleman Hall McCoy Russell & Tuttle LLP

(57) ABSTRACT

Embodiments for controlling an exhaust back-pressure valve are provided. In one example, a method for operating an engine comprises closing an exhaust back-pressure valve in response to a component temperature, and adjusting intake and/or exhaust valve operation in response to closing the exhaust back-pressure valve to reduce cylinder internal exhaust gas recirculation (EGR). In this way, combustion stability may be maintained while the exhaust back-pressure valve is closed.

19 Claims, 6 Drawing Sheets

CATALYST HEATING WITH EXHAUST BACK-PRESSURE

FIELD

The present disclosure relates to an internal combustion engine.

BACKGROUND AND SUMMARY

Catalysts positioned in the exhaust of engines act to convert emissions produced during combustion to compounds which may be released to the atmosphere. Frequently, these catalysts convert emissions most efficiently at elevated exhaust temperatures, and thus during engine cold start and warm-up conditions when the catalyst is below normal operating temperature, emissions may slip past the catalyst. One method to rapidly heat the catalyst includes increasing the temperature of exhaust gas traveling through the catalyst.

One example approach for increasing exhaust gas temperature is described in U.S. Patent Application Publication 2010/0005784. In the cited reference, an exhaust back-pressure valve positioned in the exhaust of an engine is closed to increase the exhaust temperature in order to perform a desulfination of a catalyst.

However, the inventors herein have recognized a few issues with the above approach. Increasing exhaust back-pressure by closing the exhaust back-pressure valve may increase the dilution of the cylinder charge with burned gases, resulting in unstable combustion under some conditions. Further, the diluted cylinder charge may limit the amount of spark retard that can be applied, thus limiting the temperature increase of the exhaust.

Accordingly, one embodiment to at least partly address the above issues includes a method for operating an engine. The method comprises closing an exhaust back-pressure valve in response to a component temperature, and adjusting intake and/or exhaust valve operation in response to closing the exhaust back-pressure valve to reduce cylinder internal exhaust gas recirculation.

In this way, the exhaust gas temperature may be increased responsive to a component temperature (e.g., a temperature of a catalyst being below a threshold) by throttling the exhaust via the exhaust back-pressure valve. Additionally, intake and/or exhaust valve timing may be adjusted to reduce the trapping of exhaust residuals in the cylinders, thus reducing the internal exhaust gas recirculation (e.g., dilution of the cylinder charge) and increasing combustion stability. In some examples, external exhaust gas recirculation may also be decreased to further reduce the dilution of the cylinder charge. The closure of the exhaust back-pressure valve may also be restricted to high-combustion stability operating conditions, such as low humidity and low altitude, to avoid increased combustion instability.

The present disclosure may offer several advantages. For example, rapid catalyst heating may be attained without compromising combustion stability, thus avoiding degraded exhaust emissions and potential misfires. By rapidly heating the catalyst, exhaust emissions during engine cold starts may be reduced. Additionally, by maintaining relatively low dilution even with the exhaust back-pressure valve closed, spark timing may be further retarded to increase the exhaust gas temperature.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

During an engine cold start, exhaust emissions may be released to the atmosphere before a catalyst positioned in the engine exhaust reaches operating temperature. One mechanism to rapidly heat the catalyst includes closing an exhaust back-pressure valve to throttle the exhaust, thus increasing the temperature of the exhaust passing through the catalyst. However, such throttling of the exhaust may increase the dilution of the charge in the cylinder with burned gases, thus degrading combustion stability and limiting the amount of spark retard that may be applied. To reduce the dilution of the cylinder charge, the closure of the exhaust back-pressure valve may be limited to conditions of high combustion stability, such as low humidity, low altitude, high volatility fuel, etc. Further, intake and exhaust valve overlap may be limited to reduce internal exhaust gas recirculation (EGR) and external EGR may be deactivated, thus limiting effective EGR. If indicated, the amount of spark retard may be reduced to further maintain combustion stability.

When the exhaust back-pressure valve is opened or closed, various operating parameters may be monitored to ensure the exhaust back-pressure system is not degraded. For example, while holding engine speed steady, the change in manifold pressure or throttle position may be monitored as the exhaust back-pressure valve is opened or closed, and if the pressure or throttle position remains constant, degradation may be indicated.

Figure 1:
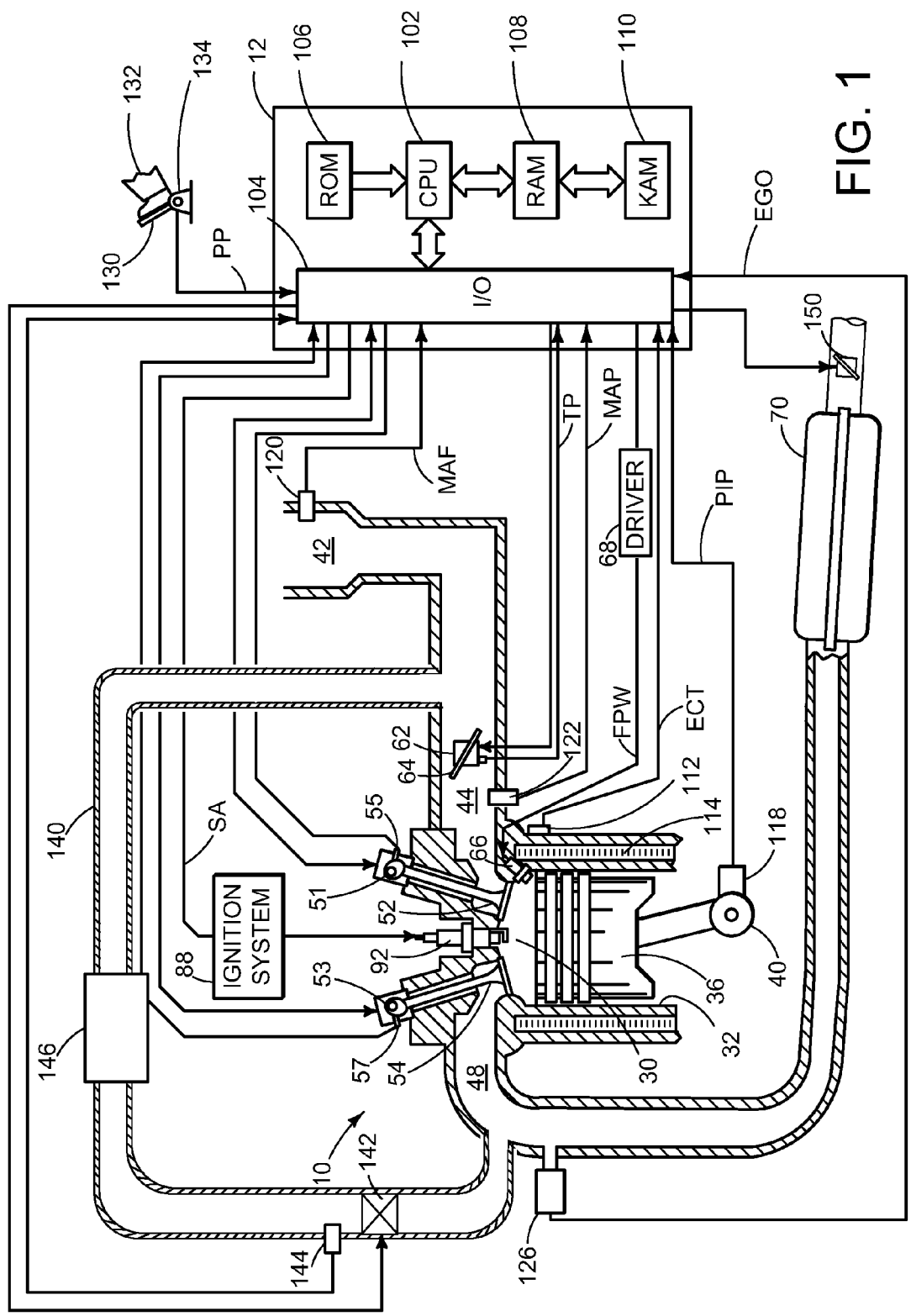
FIG. 1 shows a schematic diagram of an engine.
Figure 2:
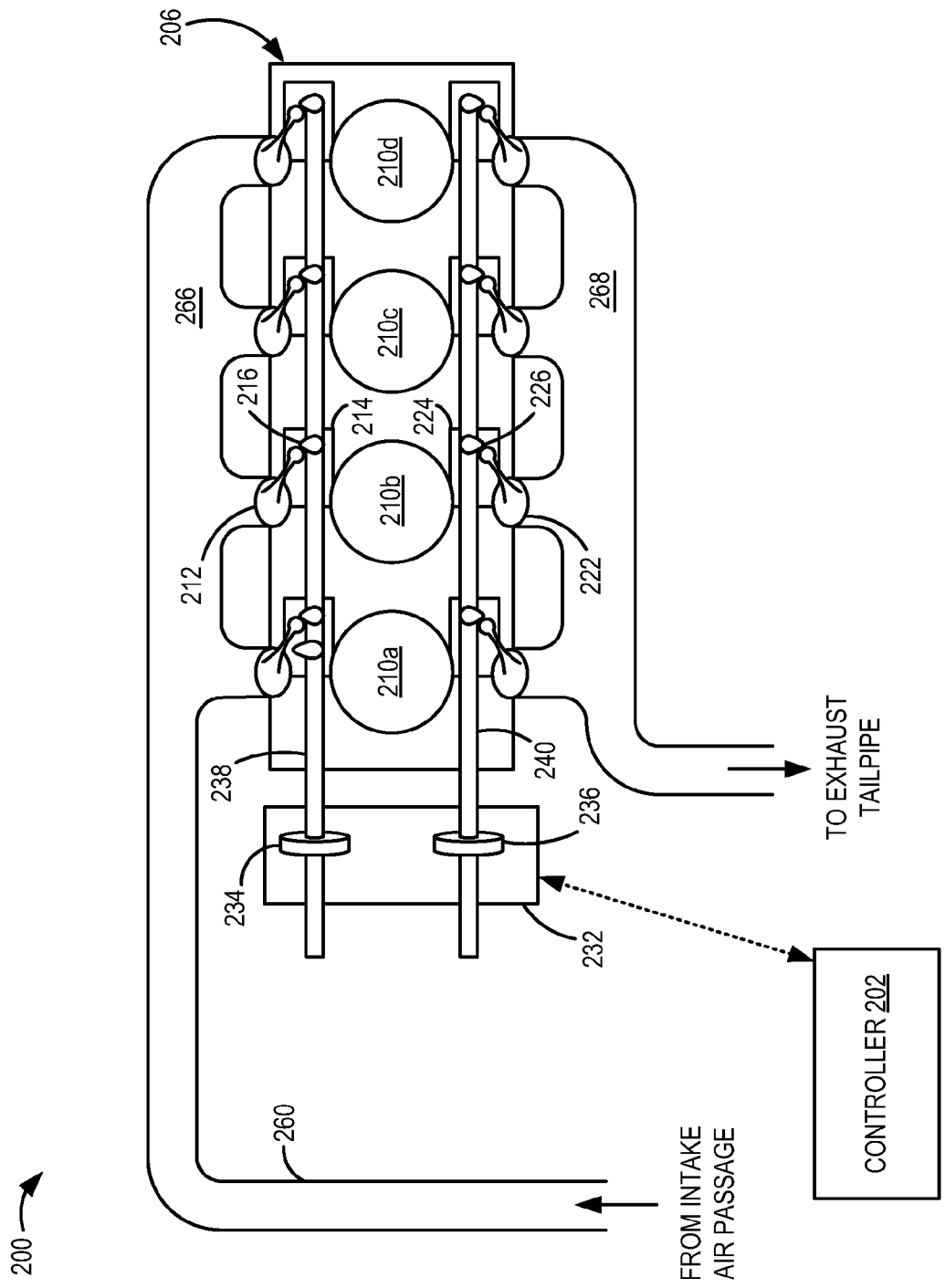
FIG. 2 shows an example variable valve timing system.
Figure 3:
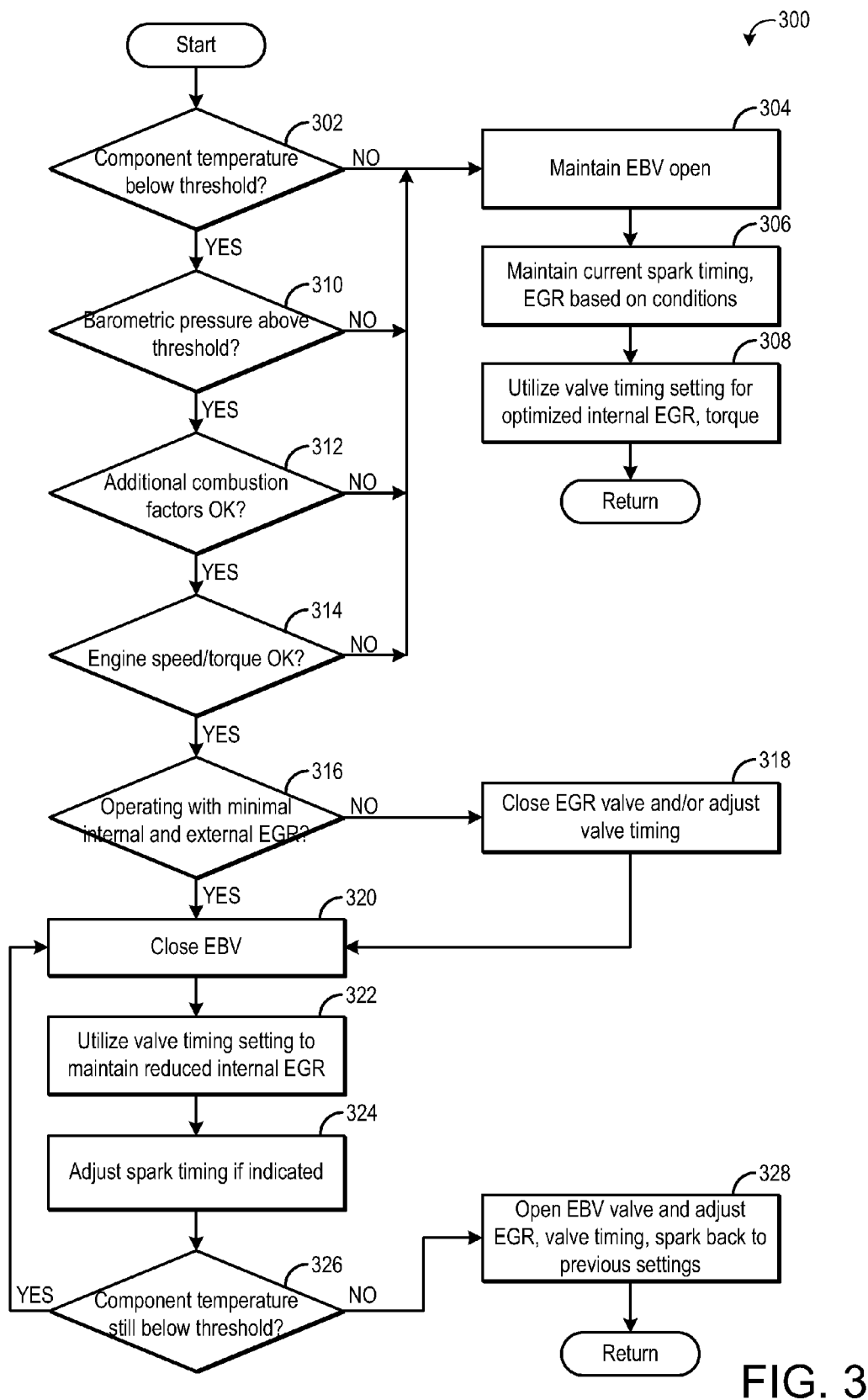
FIG. 3 is a flow chart illustrating an example method for adjusting an exhaust back-pressure valve.
Figure 4:
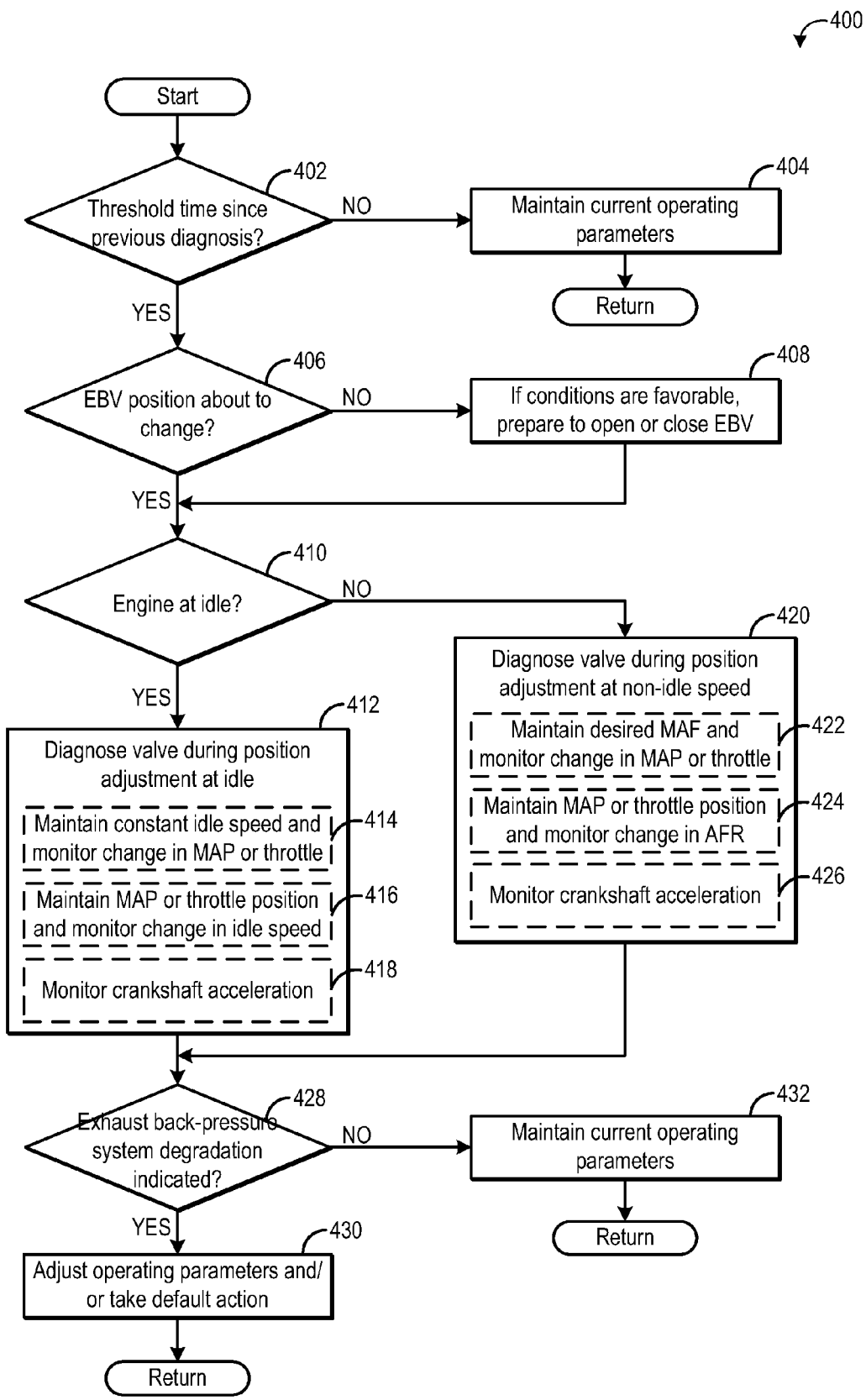
FIG. 4 is a flow chart illustrating an example method for diagnosing an exhaust back-pressure system.
Figure 5:
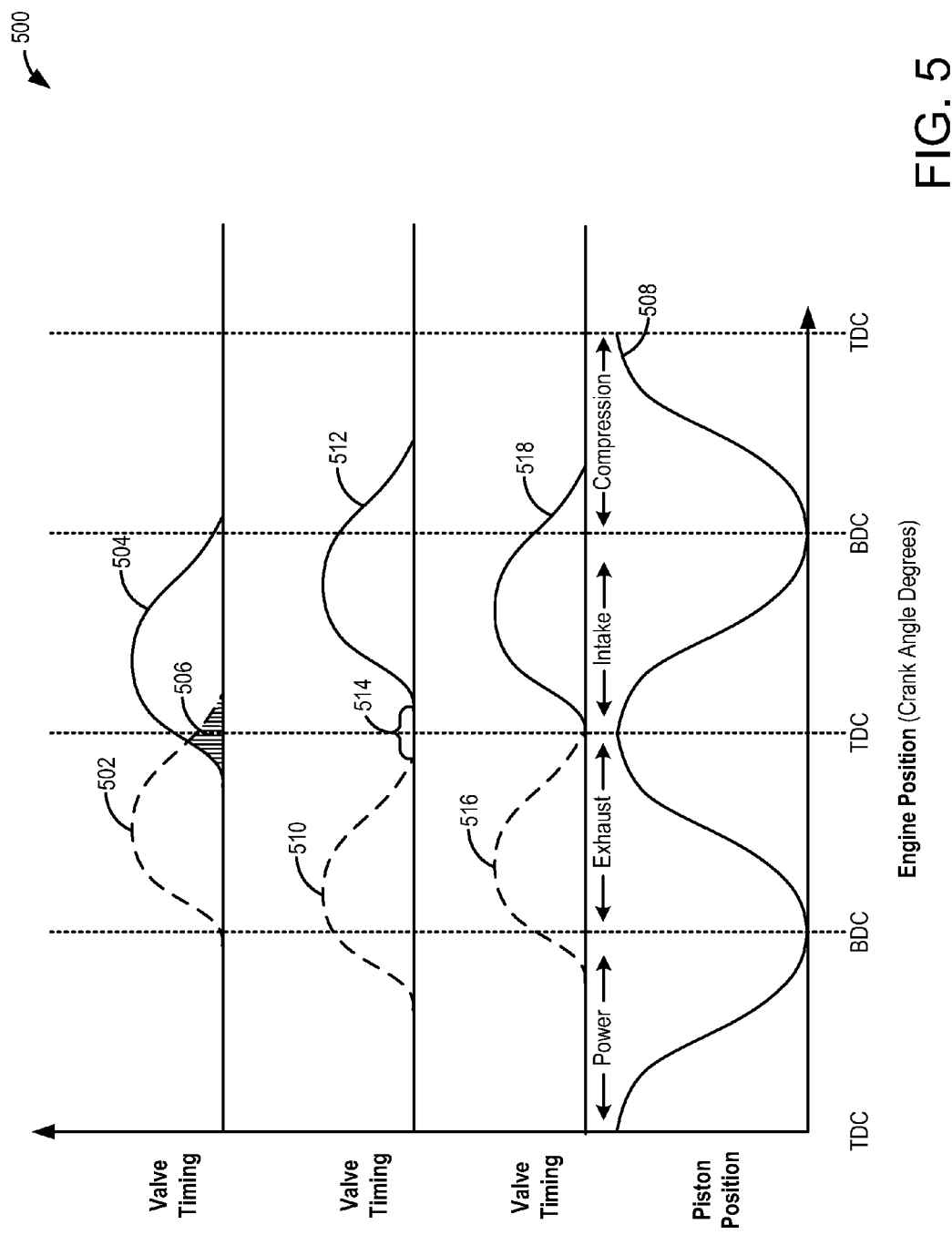
FIG. 5 is a map depicting example valve timings for a plurality of operating conditions.
Figure 6:
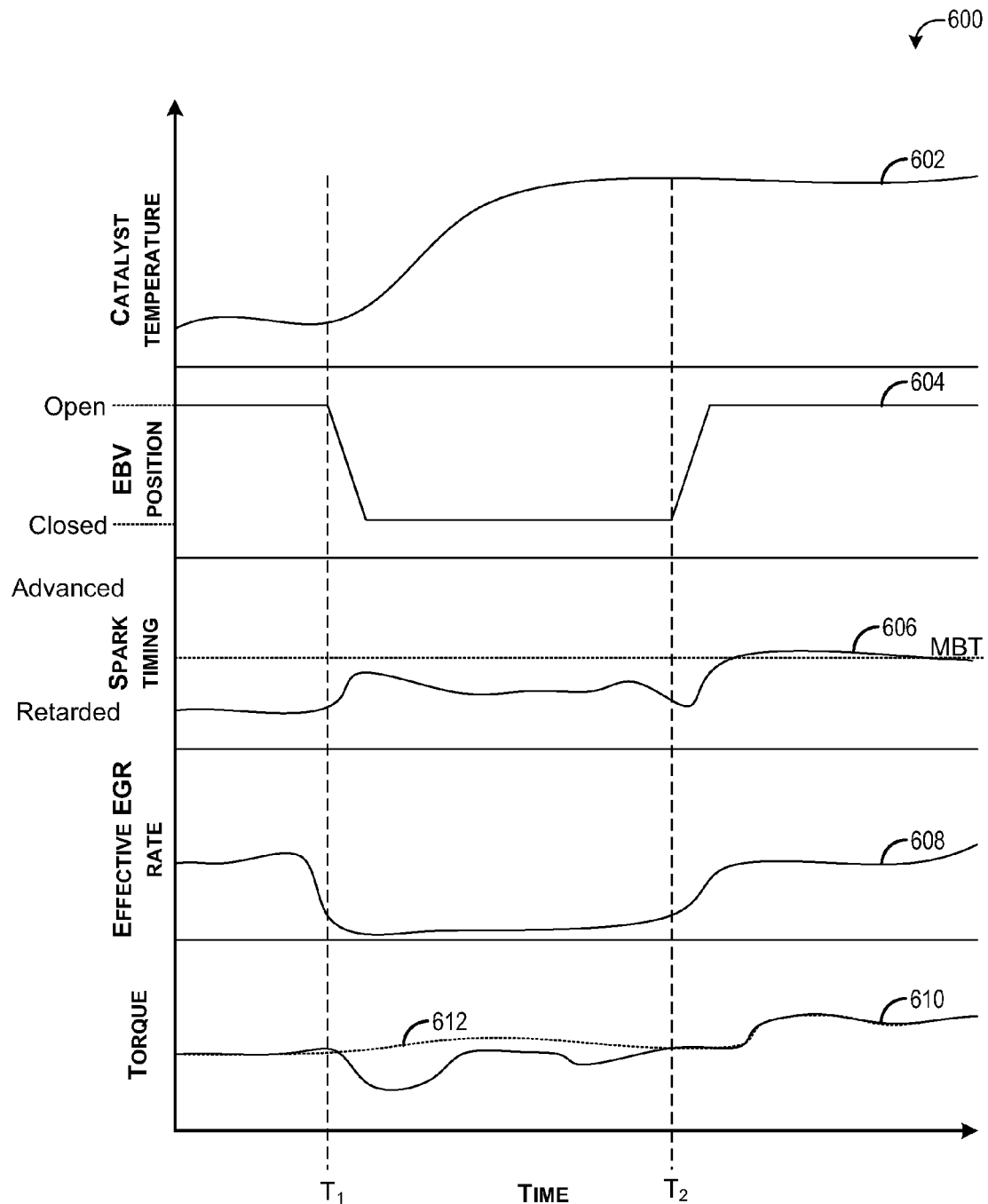
FIG. 6 is a diagram depicting example operating parameters during an adjustment of an exhaust back-pressure valve.

FIGS. 1 and 2 are example engine diagrams including an exhaust back-pressure valve, variable valve timing system, and an engine controller configured to carry out the methods illustrated in FIGS. 3 and 4. FIGS. 5 and 6 illustrate example valve events and engine operating parameters during the execution of the above-described methods.

Referring now to FIG. 1, it includes a schematic diagram showing one cylinder of multi-cylinder internal combustion engine 10. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP.

Combustion cylinder 30 of engine 10 may include combustion cylinder walls 32 with piston 36 positioned therein.

Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion cylinder 30 may receive intake air from intake manifold 44 via intake passage 42 and may exhaust combustion gases via exhaust passage 48. Intake manifold 44 and exhaust passage 48 can selectively communicate with combustion cylinder 30 via respective intake valve 52 and exhaust valve 54. In some embodiments, combustion cylinder 30 may include two or more intake valves and/or two or more exhaust valves.

In this example, intake valve 52 and exhaust valve 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 12 to vary valve operation. In one example, valve operation may be adjusted responsive to, and in coordination with, closure of an exhaust back-pressure valve 150. In one example, the valve operation may be adjusted at the same time, or within a threshold duration, as the exhaust back-pressure valve is closed. Additional detail regarding adjusting valve operation will be presented below with respect to FIG. 2. The timing of intake cam 51 and exhaust cam 53 may be determined by sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

Fuel injector 66 is shown coupled directly to combustion cylinder 30 for injecting fuel directly therein in proportion to the pulse width of signal FPW received from controller 12 via electronic driver 68. In this manner, fuel injector 66 provides what is known as direct injection of fuel into combustion cylinder 30. The fuel injector may be mounted on the side of the combustion cylinder or in the top of the combustion cylinder, for example. Fuel may be delivered to fuel injector 66 by a fuel delivery system (not shown) including a fuel tank, a fuel pump, and a fuel rail. In some embodiments, combustion cylinder 30 may alternatively or additionally include a fuel injector arranged in intake passage 42 in a configuration that provides what is known as port injection of fuel into the intake port upstream of combustion cylinder 30.

Intake passage 42 may include a throttle 62 having a throttle plate 64. In this particular example, the position of throttle plate 64 may be varied by controller 12 via a signal provided to an electric motor or actuator included with throttle 62, a configuration that may be referred to as electronic throttle control (ETC). In this manner, throttle 62 may be operated to vary the intake air provided to combustion cylinder 30 among other engine combustion cylinders. Intake passage 42 may include a mass air flow sensor 120 and a manifold air pressure sensor 122 for providing respective signals MAF and MAP to controller 12.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Exhaust gas sensor 126 is shown coupled to exhaust passage 48 upstream of catalyst 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a $NO_x$, HC, or CO sensor. The exhaust system may include light-off catalysts and underbody catalysts, as well as the exhaust manifold and upstream and/or downstream air-fuel ratio sensors. Catalyst 70 can include multiple catalyst bricks, in one example. In another example, multiple emission control devices, each with multiple bricks, can be used. Catalyst 70 can be a three-way type catalyst in one example. In other examples, catalyst 70 may be an oxidation catalyst, lean NOx trap, selective catalyst reduction (SCR) device, particulate filter, or other exhaust treatment device. An exhaust back-pressure valve 150 is located in the exhaust passage downstream of catalyst 70 (or alternatively it may be positioned upstream of catalyst 70). Exhaust back-pressure valve 150 may be maintained in a fully open position during most engine operating conditions, but may be configured to close to heat the exhaust gas under certain conditions. In some embodiments, exhaust back-pressure valve 150 may have two restriction levels, fully open or fully closed. In other embodiments, exhaust back-pressure valve 150 may be variably adjustable to a plurality of restriction levels. The position of exhaust back-pressure valve 150 may be regulated by controller 12. As used herein, a closed exhaust back-pressure valve may refer to the fully closed state of the exhaust back-pressure valve, or it may refer to a semi-closed position, wherein the exhaust is able to flow around the valve, but yet the pressure and/or flow rate of the exhaust is changed.

Further, in the disclosed embodiments, an exhaust gas recirculation (EGR) system may route a desired portion of exhaust gas from exhaust passage 48 to intake passage 42 via EGR passage 140. The amount of EGR provided to intake passage 42 may be varied by controller 12 via EGR valve 142. Further, an EGR sensor 144 may be arranged within the EGR passage and may provide an indication of one or more of pressure, temperature, flow rate, and concentration of the exhaust gas. An EGR cooler 146 may be arranged in EGR passage 140 in order to cool the recirculated exhaust prior to reaching the intake passage 42. Under some conditions, the EGR system may be used to regulate the temperature of the air and fuel mixture within the combustion chamber. Further, during some conditions, a portion of combustion gases may be retained or trapped in the combustion chamber by controlling valve timing, such as by controlling a variable valve timing mechanism.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. The controller 12 may receive various signals and information from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Storage medium read-only memory 106 can be programmed with computer readable data representing instructions executable by processor 102 for performing the methods described below as well as variations thereof.

As described above, FIG. 1 shows only one cylinder of a multi-cylinder engine, and each cylinder may similarly include its own set of intake/exhaust valves, fuel injector, spark plug, etc.

FIG. 2 shows an example embodiment of an engine 200 including a controller 202, a variable cam timing (VCT) system 232, and an engine block 206 with a plurality of cylinders 210. Engine 200 may be one example of engine 10 described in FIG. 1. Engine 200 is shown having an intake manifold 266 configured to supply intake air and/or fuel to the cylinders 210a-d and an exhaust manifold 268 configured to exhaust the combustion products from the cylinders 210. Ambient air flow can enter the intake system through intake air passage 260, wherein the flow rate and/or pressure of the intake air can be controlled at least in part by a main throttle (not shown).

Engine block 206 includes a plurality of cylinders 210a-d (herein four). In the depicted example, all the cylinders are on a common engine bank. In alternate embodiments, the cylinders may be divided between a plurality of banks. For example, cylinders 210a-b may be on a first bank while cylinder 210c-d may be on a second bank. Cylinders 210a-d may each include a spark plug and a fuel injector for delivering fuel directly to the combustion chamber, as described above in FIG. 1. Also, cylinders 210a-d may each be serviced by one or more valves. In the present example, each cylinder 210a-d includes a corresponding intake valve 212 and an exhaust valve 222. As elaborated below, engine 200 further includes one or more camshafts 238, 240 wherein each camshaft can be actuated to operate intake and/or exhaust valves of a plurality of cylinders coupled to a common camshaft.

Each intake valve 212 is actuatable between an open position that allows intake air into the corresponding cylinder and a closed position substantially blocking intake air from the cylinder. Further, FIG. 2 shows how intake valves 212 of cylinders 210a-d may be actuated by a common intake camshaft 238. Intake camshaft 238 may be included in intake valve actuation system 214. Intake camshaft 238 includes intake cam lobes 216 which have a lift profile for opening the intake valves 212 for a defined intake duration. In some embodiments (not shown), the camshaft may include additional intake cam lobes with an alternate lift profile that allows the intake valves 212 to be opened for an alternate lift and/or duration (herein also referred to as a cam profile switching system). Based on the lift profile of the additional cam lobe, the alternate duration may be longer or shorter than the defined intake duration of intake cam lobe 216. The lift profile may affect cam lift height, cam duration, opening timing, and/or closing timing. A controller may be able to switch the intake valve duration by moving the intake camshaft 238 longitudinally and switching between cam profiles.

In the same manner, each exhaust valve 222 is actuatable between an open position allowing exhaust gas out of the corresponding cylinder and a closed position substantially retaining gas within the cylinder. Further, FIG. 2 shows how exhaust valves 222 of cylinders 210a-d may be actuated by a common exhaust camshaft 240. Exhaust camshaft 240 may be included in exhaust valve actuation system 224. Exhaust camshaft 240 includes exhaust cam lobes 226 which have a lift profile for opening the exhaust valves 222 for a defined exhaust duration. In some embodiments (not shown), the camshaft may include additional exhaust cam lobes with an alternate lift profile that allows the exhaust valves 222 to be opened for an alternate lift and/or duration. Based on the lift profile of the additional cam lobe, the alternate duration may be longer or shorter than the defined exhaust duration of exhaust cam lobe 226. The lift profile may affect cam lift height, cam duration, opening timing, and/or closing timing. A controller may be able to switch the exhaust valve duration by moving the exhaust camshaft 240 longitudinally and switching between cam profiles.

It will be appreciated that while the depicted example shows common intake camshaft 238 coupled to the intake valves of each cylinder 210a-d, and common exhaust camshaft 240 coupled to the exhaust valves of each cylinder 201a-d, in alternate embodiments, the camshafts may be coupled to cylinder subsets, and multiple intake and/or exhaust camshafts may be present. For example, a first intake camshaft may be coupled to the intake valves of a first subset of cylinders (e.g., coupled to cylinders 210a-b) while a second intake camshaft may be coupled to the intake valves of a second subset of cylinders (e.g., coupled to cylinders 210c-d). Likewise, a first exhaust camshaft may be coupled to the exhaust valves of a first subset of cylinders (e.g., coupled to cylinders 210a-b) while a second exhaust camshaft may be coupled to the exhaust valves of a second subset of cylinders (e.g., coupled to cylinders 210c-d). Further still, one or more intake valves and exhaust valves may be coupled to each camshaft. The subset of cylinders coupled to the camshaft may be based on their position along the engine block 206, their firing order, the engine configuration, etc.

Intake valve actuation system 214 and exhaust valve actuation system 224 may further include push rods, rocker arms, tappets, etc. Such devices and features may control actuation of the intake valves 212 and the exhaust valves 222 by converting rotational motion of the cams into translational motion of the valves. As previously discussed, the valves can also be actuated via additional cam lobe profiles on the camshafts, where the cam lobe profiles between the different valves may provide varying cam lift height, cam duration, and/or cam timing. However, alternative camshaft (overhead and/or pushrod) arrangements could be used, if desired. Further, in some examples, cylinders 210a-d may each have more than one exhaust valve and/or intake valve. In still other examples, each of the exhaust valve 222 and intake valve 212 of one or more cylinders may be actuated by a common camshaft. Further still, in some examples, some of the intake valves 212 and/or exhaust valves 222 may be actuated by their own independent camshaft or other device.

Engine 200 may include variable valve timing systems, for example, variable cam timing VCT system 232. VCT system 232 may be a twin independent variable camshaft timing system, for changing intake valve timing and exhaust valve timing independently of each other. VCT system 232 includes intake camshaft phaser 234 coupled to the common intake camshaft 238 for changing intake valve timing and exhaust camshaft phaser 236 coupled to common exhaust camshaft 240 for changing exhaust valve timing. VCT system 232 may be configured to advance or retard valve timing by advancing or retarding cam timing and may be controlled via signal lines by controller 202. VCT system 232 may be configured to vary the timing of valve opening and closing events by varying the relationship between the crankshaft position and the camshaft position. For example, VCT system 232 may be configured to rotate intake camshaft 238 and/or exhaust camshaft 240 independently of the crankshaft to cause the valve timing to be advanced or retarded. In some embodiments, VCT system 232 may be a cam torque actuated device configured to rapidly vary the cam timing. In some embodiments, valve timing such as intake valve closing (IVC) and exhaust valve closing (EVC) may be varied by a continuously variable valve lift (CVVL) device.

A variable valve timing system may be configured to open a first valve at a first timing during a first operating mode. The first operating mode may occur when an engine component temperature is above a threshold (e.g., a catalytic converter). Further, the variable valve timing system may be configured to open the first valve at a second timing earlier than the first timing, during a second operating mode. The second operating mode may occur when the component temperature is below the threshold. Alternatively or additionally, the variable valve timing system may be configured to open the first valve for a first duration during the first operating mode, and open the first valve for a second, shorter duration during the second operating mode. In one example, the first valve may be an exhaust valve, and the variable valve timing system may be configured to switch between valve timings of the exhaust valve in order to reduce positive valve overlap between the exhaust valve and an intake valve. The variable valve timing system may be configured to switch the timing of the opening and/or closing of the intake valve in addition or alternatively to the adjusting of the exhaust valve timing.

The valve/cam control devices and systems described above may be hydraulically actuated, or electrically actuated, or combinations thereof. In one example, a position of the camshaft may be changed via cam phase adjustment of an electrical actuator (e.g., an electrically actuated cam phaser) with a fidelity that exceeds that of most hydraulically operated cam phasers. Signal lines can send control signals to and receive a cam timing and/or cam selection measurement from VCT system 232.

In the depicted example, since the intake valves of all the cylinders 210*a-d* are actuated by a common intake camshaft, a change in the position of the intake camshaft 238 will affect the intake valve position and timing of all the cylinders. Likewise, since the exhaust valves of all the cylinders 210*a-d* are actuated by a common exhaust camshaft, a change in the position of the exhaust camshaft 240 will affect the exhaust valve position and timing of all the cylinders. For example, a change in position of the intake and/or exhaust camshaft that advances the (intake or exhaust) valve timing of a first cylinder 210*a* will also advance the (intake or exhaust) valve timing of the remaining cylinders 210*b-d* at the same time. However, adjustment of the valve timing may be performed on one or more cylinders independent of the valve timing of the remaining cylinders.

As described above, FIG. 2 shows a non-limiting example of an internal combustion engine and associated intake and exhaust systems. It should be understood that in some embodiments, the engine may have more or fewer combustion cylinders, control valves, throttles, and compression devices, among others. Example engines may have cylinders arranged in a "V" configuration. Further, a first common camshaft may control the valves for a first set of cylinders on a first bank while a second camshaft may control the valves for a second set of cylinders on a second bank. That is, a common camshaft of a cam actuation system (e.g., a VCT system) may be used to control valve operation of a group of cylinders.

Thus, FIG. 2 illustrates variable valve timing systems that may be used to adjust the intake valve opening, intake valve closing, exhaust valve opening, and exhaust valve closing events of one or more cylinders of an engine. As described in more detail below, the valve timing may be adjusted prior to, during, or following opening or closing of an exhaust back-pressure valve to adjust the amount of dilution present in the cylinder charge. In one example, the intake and exhaust valve timing may be set based on engine speed and load in order to optimize intake efficiency and internal EGR (which may reduce engine emissions, such as NOx). Responsive to closure of the exhaust back-pressure valve, the valve timing may be adjusted to reduce internal EGR in order to maintain combustion stability.

In some embodiments, the engine systems described above with respect to FIGS. 1 and 2 provide for a system, comprising an engine including a variable camshaft timing system; a catalyst positioned in an exhaust of the engine; an exhaust back-pressure valve positioned downstream of the catalyst; and a controller including instructions to close the exhaust back-pressure valve when a temperature of the catalyst is below a threshold, and adjust the variable camshaft timing system to reduce intake and exhaust valve overlap responsive to the closing of the exhaust back-pressure valve.

The controller may include further instructions to advance spark timing responsive to the closing of the exhaust back-pressure valve. The system may further comprise an EGR system to route exhaust to an intake of the engine, and the controller may include further instructions to close an EGR valve of the EGR system when the exhaust back-pressure valve is closed. The controller may include further instructions to, if the temperature of the catalyst is above the threshold, then open the exhaust back-pressure valve. The controller may include instructions to adjust the variable camshaft timing system to reduce positive intake and exhaust valve overlap in one example, and may include instructions to adjust the variable camshaft timing system to reduce negative intake and exhaust valve overlap in another example.

In other embodiments, a system comprises an engine including a variable camshaft timing system; a catalyst positioned in an exhaust of the engine; an exhaust back-pressure valve positioned downstream of the catalyst; and a controller including instructions to close the exhaust back-pressure valve when a temperature of the catalyst is below a threshold, and responsive to the closing of the exhaust back-pressure valve, adjust the variable camshaft timing system to reduce intake and exhaust valve overlap and indicate degradation of the exhaust back-pressure valve based on crankshaft acceleration.

The controller may include instructions to indicate degradation if crankshaft acceleration does not change while the exhaust back-pressure valve closes. The controller may also include further instructions to advance spark timing responsive to the closing of the exhaust back-pressure valve. The system may further comprise an EGR system to route exhaust to an intake of the engine, and the controller may include further instructions to close an EGR valve of the EGR system when the temperature of the catalytic converter is below the threshold. The controller may include further instructions to, if the temperature of the catalyst is above the threshold, then open the exhaust back-pressure valve. The controller may also include further instructions to indicate degradation of the exhaust back-pressure valve if crankshaft acceleration does not change as the exhaust back-pressure valve opens.

Turning now to FIG. 3, a method 300 for controlling an exhaust back-pressure valve is presented. Method 300 may be carried out by a controller, such as controller 12 or controller 202, according to instructions stored thereon. Method 300 may adjust the position of an exhaust back-pressure valve, such as valve 150, in response to operating conditions of the engine, which may be determined based on feedback from various engine sensors.

At 302, method 300 includes determining if a component temperature is below a threshold. The component temperature may be the temperature of catalyst 70 positioned in the engine exhaust. Other component temperatures that may be evaluated include the engine itself, or other emission control devices. The threshold temperature may be the light-off temperature of the catalyst, or warmed-up operating temperature of the engine, or temperature at which engine stop-start is feasible, or other suitable temperature. In some examples, it may be determined that the component is operating below threshold temperature based on monitoring of the actual temperature of the component or exhaust gas. However, in other examples, it may be estimated that the component is operating below the threshold temperature based on engine operating conditions. For example, during an engine cold start, it may be assumed the catalyst is operating below light-off temperature. Thus, if the engine has just been started or is about to start, and engine temperature is at ambient temperature, it may be determined the engine is operating with a cold start and thus at low catalyst temperature. In another example, an exhaust treatment device, such as a particulate filter, may undergo a regeneration event, in which the temperature of the filter is increased to burn off accumulated particulates. Thus, if it is determined that a component is to be regenerated, it may be determined that the component is below the threshold temperature to perform the regeneration.

If the component temperature is not below the threshold, heating of the exhaust is not indicated, and method 300 proceeds to 304 to maintain the exhaust back-pressure valve (EBV) in the fully open position (which may be the default position for the EBV at start-up of the engine). At 306, the current spark timing and EGR amounts may be maintained. The current spark timing and EGR amounts may be based on operating conditions, such as engine speed and load. At 308, intake and exhaust valve timing settings are utilized that are optimized for internal EGR and torque or other parameters. The valve timing may also be set based on engine speed and load or other operating conditions. Method 300 then returns.

Returning to 302, if it is determined that the component is operating below the threshold temperature, method 300 proceeds to 310 to determine if barometric pressure is above a threshold. The threshold barometric pressure may be a pressure below which the engine cannot achieve the desired engine speed and/or torque with the EBV closed and retarded spark timing. For example, the engine may not be able to achieve a high idle speed with the transmission in drive and certain accessories active, if the EBV is closed and the spark is retarded to heat the catalyst. The barometric pressure may be measured by a pressure sensor that determines the pressure of the air entering the intake system of the engine. In other embodiments, the barometric pressure may be correlated based on the altitude at which the engine is operating; the lower the altitude, the higher the barometric pressure. In yet another embodiment, the barometric pressure may be inferred based on the relationship between throttle angle and airflow, or based on a MAP sensor reading at certain conditions when pressure drop across the throttle is small. At relatively low barometric pressure, the amount of mass airflow may be low enough to substantially limit engine performance, especially with the EBV closed and spark retarded. If the exhaust back-pressure valve is closed when the engine is operating in low barometric pressure conditions, poor performance or engine stalling or other problems may occur. Thus, if it is determined that barometric pressure is not above the threshold, method 300 proceeds to 304 to keep the EBV valve open to avoid poor performance or engine stalling.

If it is determined that the barometric pressure is above the threshold, method 300 proceeds to 312 to determine if additional combustion factors are at suitable levels. The additional combustion factors may include factors that impact combustion stability, including humidity of the intake air, quality of the fuel injected to the engine (e.g., fuel volatility), ambient temperature, component temperature(s), level of adaptive learning of air-fuel ratio of the controller, etc. If the additional combustion factors are not at suitable levels, method 300 proceeds back to 304 to maintain the EBV open. However, if the additional combustion factors are at suitable levels (e.g., if it is determined that the engine could achieve stable combustion with the EBV closed), method 300 proceeds to 314 to determine if the current engine speed and torque request is suitable to close the exhaust back-pressure valve. Closing the EBV reduces flow of intake air into the cylinders. If the engine is operating with high speed and/or load, for example, closing the EBV may limit the speed of the engine or torque produced by the engine. Thus, if the current engine speed and torque request cannot be delivered with the EBV closed, method 300 proceeds back to 304 to maintain the EBV open.

If the current speed and torque may be delivered with the valve closed, method 300 proceeds to 316 to determine if the engine is operating with minimal internal and external EGR. Minimal external EGR may be defined by the EGR valve controlling the EGR system being fully closed; minimal internal EGR may include intake and exhaust valve timing that results in as little trapped exhaust residuals in the cylinders as possible (e.g., minimum effective valve overlap). If the engine is not operating with minimal EGR, method 300 proceeds to 318 to close the EGR valve to deactivate EGR and/or adjust valve timing to reduce valve overlap.

The valve timing may be adjusted by adjusting a variable valve timing system, as described above with respect to FIG. 2. An example adjustment to the valve timing is illustrated in FIG. 5, which shows a map 500 of valve timing and piston position, with respect to an engine position, for a given engine cylinder during multiple engine operating modes. During standard, warmed up engine operation, the engine may be configured to operate with intake and exhaust valve timing optimized for the current operating conditions (such as engine speed and load). During this mode of operation, the intake and exhaust valves may open and close at specific timings in order to produce valve overlap. Such valve overlap may increase the amount of exhaust remaining in the cylinders during combustion (referred to as internal EGR), improving engine efficiency and reducing emissions during some conditions. However, during a second mode of operation, such as when a catalyst is below light-off temperature, the amount of internal EGR may be reduced in order to maintain combustion stability and enable an exhaust back-pressure valve to be closed and spark timing to be or remain retarded, thus heating the catalyst. Thus, if the engine is operating with valve overlap during the first mode, when transitioning to the second mode of operation the amount of valve overlap may be reduced or eliminated to reduce the amount of exhaust residuals diluting the cylinder charge.

Map 500 illustrates an engine position along the x-axis in crank angle degrees (CAD). Curve 508 depicts piston positions (along the y-axis), with reference to their location from top dead center (TDC) and/or bottom dead center (BDC), and further with reference to their location within the four strokes (intake, compression, power and exhaust) of an engine cycle. As indicated by approximately sinusoidal curve 508, a piston gradually moves downward from TDC, bottoming out at BDC by the end of the power stroke. The piston then returns to the top, at TDC, by the end of the exhaust stroke. The piston then again moves back down, towards BDC, during the intake stroke, returning to its original top position at TDC by the end of the compression stroke.

Curves 502 and 504 depict valve timings for an exhaust valve (dashed curve 502) and an intake valve (solid curve 504) during a first example of normal engine operation at part load. As illustrated, an exhaust valve may be opened near the time that the piston bottoms out at the end of the power stroke. The exhaust valve may then close as the piston completes the exhaust stroke, remaining open at least until a subsequent intake stroke has commenced. In the same way, an intake valve may be opened at or before the start of an intake stroke, and may remain open at least until a subsequent compression stroke has commenced.

As a result of the timing differences between exhaust valve closing and intake valve opening, for a short duration, before the end of the exhaust stroke and after the commencement of the intake stroke, both intake and exhaust valves may be open. This period, during which both valves may be open, is referred to as a positive intake to exhaust valve overlap 506 (or simply, valve overlap), represented by a hatched region at the intersection of curves 502 and 504. In one example, the valve overlap 506 may be a default cam position of the engine.

In a second example of normal engine operation, the intake and exhaust valve timing may be set to produce a period of negative valve overlap, wherein a period of time elapses between when the exhaust valve is fully closed and when the intake valve starts to open. This negative valve overlap may act to trap residual combustion gases in the cylinder (as the exhaust valve closes before the piston has reached TDC). Additionally, by delaying opening of the intake valve until after the piston has started to descend following TDC, a vacuum may be created, thus drawing intake air into the cylinder at a faster rate when the intake valve opens.

Curves 510 and 512 depict valve timings for an exhaust valve (dashed curve 510) and an intake valve (solid curve 512) during the second example of normal engine operation. As illustrated, an exhaust valve may be opened before the piston bottoms out at the end of the power stroke. The exhaust valve may then close before the piston completes the exhaust stroke, closing before a subsequent intake stroke has commenced. In the same way, an intake valve may be opened at or after the start of an intake stroke, and may remain open at least until a subsequent compression stroke has commenced.

As a result of the timing differences between exhaust valve closing and intake valve opening, for a short duration, during the end of the exhaust stroke and the beginning of the intake stroke, both intake and exhaust valves may be closed. This period, during which both valves may be closed, is referred to as a negative intake to exhaust valve overlap 514 (or simply, negative valve overlap), represented by the region between curves 510 and 512.

Referring now to an example of engine operation during a catalytic converter warm-up phase, the valve timing set during normal part load engine operation may be adjusted to maintain combustion stability and/or enable retarded spark timing with a closed exhaust back-pressure valve. To heat the catalyst, the exhaust back-pressure valve downstream of the catalyst may be closed. However, the closing of the exhaust back-pressure valve increases the amount of exhaust (dilution) trapped in the cylinders, thus potentially degrading combustion. To ensure stable combustion during the closure of the exhaust back-pressure valve, the amount of exhaust present in the cylinders during combustion may be reduced, by both reducing external EGR (e.g., closing an EGR valve) and reducing internal EGR. To reduce the internal EGR, the intake and/or exhaust valve timings may be adjusted.

Curves 516 and 518 depict valve timings for an exhaust valve (dashed curve 516) and an intake valve (solid curve 518) during the example of engine operation with a cold catalyst. As illustrated, an exhaust valve may be opened before the piston bottoms out at the end of the power stroke. The exhaust valve may then close as the piston completes the exhaust stroke, closing during the transition to a subsequent intake stroke. Thus, the exhaust valve illustrated by curve 516 may open before the exhaust valve of curve 502 but after the exhaust valve of curve 510. In the same way, an intake valve may be opened at the start of an intake stroke, and may remain open at least until a subsequent compression stroke has commenced.

As a result of the timing of the exhaust valve closing and intake valve opening, the exhaust valve closes just as the intake valve opens. In doing so, the amount of cylinder dilution that may result from operation with positive or negative valve overlap may be reduced prior to opening the exhaust back-pressure valve.

Thus, as illustrated in FIG. 5, if the engine is initially operating with positive valve overlap and an open exhaust back-pressure valve and transitions to operate with reduced or no valve overlap when the exhaust back-pressure valve is closed, the exhaust valves may be adjusted to open and close earlier, and the intake valves may be adjusted to open and close later. However, in other embodiments, only the timing of the exhaust valve may be adjusted, or only the timing of the intake valve may be adjusted. Further, in another embodiment, rather than adjusting the timing of both the opening and the closing of a respective valve, the duration of the valve opening may be adjusted. For example, when transitioning to operation with no or reduced valve overlap, the exhaust valve may be opened at the same time, but may be opened for a shorter duration, thus closing earlier. Further still, the amount of valve overlap may be reduced but not completely eliminated when the exhaust back-pressure valve is closed, or in some embodiments, the amount of valve overlap may be increased.

Returning to FIG. 3, after closing the EGR valve and/or adjusting valve timing at 318, method 300 proceeds to 320 to close the EBV. Further, if it was previously determined at 316 that the engine is already operating with minimal internal and external EGR, method 300 also proceeds to 320 to close the EBV, as the engine is operating with stable combustion conditions. By closing the EBV, the exhaust pressure increases. The increased exhaust pressure causes the energy loss that occurs due to blowdown during opening of the exhaust valve to instead be moved to the EBV (which is located downstream of the catalyst). This in turn increases the energy (e.g., heat) in the exhaust through the catalyst, thus heating the catalyst. Furthermore, a closed EBV and higher exhaust pressure cause higher exhaust density, which may improve heat transfer from the hot exhaust gas to the relatively cool catalyst, thus also heating the catalyst. At 322, a valve timing is utilized to maintain the reduced internal EGR. The valve timing used here may be the same timing set at 318, or it may be a different timing that minimizes internal EGR. This valve timing may be different than the valve timing utilized when the EBV is open.

At 324, spark timing may be adjusted if indicated. To further heat the exhaust beyond the closing of the EBV, the spark timing may be retarded. Thus, if the combustion conditions are stable enough, the spark timing may be retarded from the spark timing set prior to closing the EBV, for example retarded from MBT (minimum spark advance for best torque). However, if retarding spark timing would degrade combustion stability, for example, the spark timing may be maintained at the current timing, or it may be advanced. Furthermore, if higher engine torque and/or RPM are requested, spark timing may be advanced to increase engine torque and/or RPM.

At 326, it is determined if the component temperature is still below the threshold. If yes, method 300 loops back to 320 to keep the EBV closed and adjust any operating parameters to maintain combustion stability. If the component temperature is no longer below the threshold, method 300 proceeds to 328 to open the EBV and adjust EGR, valve timing, and spark back to original settings, or to settings based on the current speed and load. Method 300 then returns.

Thus, in one embodiment, method 300 of FIG. 3 provides for a method for an engine, comprising during a first condition, operating the engine with a first, higher amount of spark retard and an open exhaust back-pressure valve, and during a second condition, operating the engine with a second, lower amount of spark retard and a closed exhaust back-pressure valve.

The first condition may comprise catalyst temperature above a threshold, and the second condition may comprise catalyst temperature below the threshold. The second condition may further comprise stable combustion conditions. Additionally or alternatively, the first condition may comprise operation at a barometric pressure below a threshold, and the second condition may comprise operation at barometric pressure above the threshold.

The method may further comprise, during the first condition, operating the engine with a first amount of intake and exhaust valve overlap, and during the second condition, operating the engine with a second amount of intake and exhaust valve overlap. The second amount of intake and exhaust valve overlap may comprise no intake and exhaust valve overlap. The method may also further comprise, during the first condition, adjusting an EGR valve to provide a requested EGR amount based on engine speed and load, and during the second condition, closing the EGR valve.

Turning now to FIG. 4, a method 400 for diagnosing an exhaust back-pressure valve is presented. Method 400 may be carried out by controller 12 to determine if there is any degradation in the exhaust back-pressure system, such as an exhaust leak or degradation of the exhaust back-pressure valve 150 or its actuator. Method 400 may be carried out along with method 300 of FIG. 3, in order to diagnose the exhaust back-pressure system during opening or closing of the EBV. Thus, while various operating conditions are monitored to determine if the exhaust back-pressure system is degraded while the EBV is closed, for example, combustion stability may be maintained by adjusting valve timing, external EGR, spark timing, etc., as explained above.

Method 400 includes, at 402, determining if a threshold amount of time has elapsed since a previous EBV diagnosis. The threshold amount of time may be a suitable interval, such as 20 engine starts, or it may be an actual amount of engine operation time, such as 10 hours. If the threshold amount of time since a previous diagnosis has not elapsed, method 400 proceeds to 404 to maintain current operating parameters, and method 400 returns.

If the threshold amount of time since the previous diagnosis has elapsed, method 400 proceeds to 406 to determine if the EBV position is about to change. The EBV may close when a catalyst temperature is below a threshold, as described above with respect to FIG. 3, and it may open once the catalyst has reached operating temperature. During closure or opening of the valve, various engine operating parameters may fluctuate as a result of the valve movement. For example, as the valve closes, mass air flow into the engine may decrease. Thus, the fluctuating engine parameters may be monitored during movement of the EBV to diagnose possible degradation of the exhaust back-pressure system. Additionally, as the valve moves, additional engine operating parameters, such as internal and external EGR and spark timing, may be adjusted to maintain combustion stability, as explained with respect to FIG. 3. Movement of the EBV may be detected based on a signal sent from the controller to the EBV, or it may be based on current operating conditions (e.g., a catalyst temperature below a threshold).

If the EBV position is about to change, method 400 proceeds to 410, which will be explained in greater detail below. If the EBV position is not about to change, method 400 proceeds to 408 to prepare to open or close the EBV if conditions are favorable. Favorable conditions include the combustion stable conditions described above with respect to FIG. 3, such as low humidity, low effective EGR, etc. Preparing to open or close the valve may include changing engine operating parameters to provide combustion stability during movement of the valve. For example, the intake and/or exhaust valve timing may be adjusted, the amount of EGR recirculated to the intake may be reduced, and spark timing may be adjusted. However, if conditions are not favorable to move the valve, method 400 may wait until a time when the valve is about to move responsive to operating conditions, or may wait until the combustion conditions are favorable to purposely move the valve before proceeding.

After preparing to move the EBV at 408 or if it is determined that the position of the EBV is about to change at 406, method 400 proceeds to 410 to determine if the engine is currently operating at idle. If the engine is operating at idle, method 400 proceeds to 412 to diagnose the exhaust back-pressure system while the EBV position is changing at idle engine operation. Diagnosing the EBV during idle operation may involve the monitoring of one or more engine operating parameters. For example, as indicated at 414, the idle speed may be maintained at a constant speed during the EBV movement, and the change in MAP or throttle position may be monitored. If engine speed is kept constant while the EBV is opened or closed, the intake manifold pressure will change to balance the change in exhaust back-pressure, and thus a fluctuation in the MAP should be observed (e.g., the MAP may increase as the EBV closes). Further, to maintain a constant idle engine speed as the EBV moves, the throttle position will change to alter MAP and balance the change in exhaust back-pressure resulting from the change in the EBV position. For example, as the EBV closes, mass air flow may initially decrease, and thus the throttle may open to admit more air to the engine to maintain engine speed. Thus, if a change in MAP or throttle position is not observed, degradation of the exhaust back-pressure system is indicated.

As used herein, the terms "constant," "maintain," and "does not change" may refer to an operating period wherein the operating parameter being monitored or controlled does not change beyond a threshold amount. For example, when maintaining constant idle engine speed, the speed of the engine may vary from an average value by less than a threshold amount, such as 5%. Furthermore, the operating parameter may be kept constant for a specific duration, such as the time during which the EBV position changes and a threshold duration following the movement of the EBV, such as two seconds. Similarly, it may be determined that the monitored operating parameter does not change responsive to movement of the EBV if the monitored operating parameter does not change from an average value by more than a threshold amount, such as 5%, during a given operating period, such as when the EBV is moving and two seconds following the moving of the EBV.

Another example of an operating parameter that may change during EBV movement is idle engine speed, as indicated at 416. If MAP or throttle position is kept constant during movement of the EBV, idle speed will change as the air flow through the engine changes. Thus, if MAP or throttle position is kept constant during movement of the EBV at idle speed, if the idle speed does not change, degradation of the exhaust back-pressure system is indicated. A further example of an operating parameter that may change during movement of the EBV is crankshaft acceleration, as indicated at 418. For example, torque may fluctuate as the EBV valve moves; as the EBV closes, torque may drop, at least initially, due to the reduction in mass air flow. Changes in torque may be determined based on changes in crankshaft acceleration (determined, for example, based on feedback from sensor 118). Additionally or alternatively, knocking or misfire or other combustion degradation may be detected based on changes in crankshaft acceleration, and as explained earlier, movement of the EBV may cause combustion instability. Thus, if crankshaft acceleration does not change as the EBV moves, degradation of the exhaust back-pressure system may be indicated.

After monitoring the one or more operating parameters during movement of the EBV at idle, method 400 proceeds to 428, which will be explained in more detail below. Returning to 410, if it is determined that the engine is not operating at idle, method 400 proceeds to 420 to diagnose the EBV during EBV movement at non-idle engine speed. Similar to diagnosing the EBV at idle, diagnosing the EBV at non-idle speed may include monitoring of one or more engine operating parameters, including MAP or throttle, as indicated at 422. During non-idle speed conditions (e.g., when the vehicle in which the engine is installed is moving), MAF may be kept constant as the EBV moves. To keep MAF constant, the throttle position changes as the EBV moves, and/or the MAP changes. Thus, as the EBV opens or closes at constant MAF, if MAP or throttle position does not change, degradation of the exhaust back-pressure system is indicated. In another example, indicated at 424, if MAP or throttle position is kept constant while the EBV moves, changes in the air-fuel ratio of the engine may be monitored. Thus, with constant MAP or throttle position at non-idle engine speed, if air-fuel ratio does not change as the EBV opens or closes, degradation of the exhaust back-pressure system is indicated. Monitoring the MAP or throttle at constant MAF, as indicated at 422, and monitoring the air-fuel ratio at constant MAP or throttle, indicated at 424, may also be performed at idle speed. Finally, at 426, crankshaft acceleration changes may be monitored at non-idle speeds, similar to the crankshaft acceleration monitoring at 418.

After diagnosing the exhaust back-pressure system at non-idle speed at 420, and after diagnosing the EBV at idle speed at 412, method 400 proceeds to 428 to determine if degradation of the exhaust back-pressure system is indicated, based on the monitoring done at 420 or 412. If degradation is indicated, method 400 proceeds to 430 to adjust operating parameters and/or take default action. If the exhaust back-pressure system is degraded, the additional operating parameters that are adjusted responsive to closing of the EBV may be kept at their pre-EBV movement levels when the component temperature is below the threshold, as the EBV will not be closed if it is degraded. Further, if the EBV cannot be closed due to degradation, other parameters may be adjusted to heat the catalyst instead of adjusting the EBV position. Default action taken responsive to exhaust back-pressure system degradation may include notifying an operator of the vehicle (such as by lighting a malfunction indicator light) and/or setting a diagnostic code. Method 400 then returns. However, if no degradation is indicated at 428, current operating parameters are maintained at 432, and method 400 returns. Maintaining current operating parameters may include releasing the EBV from a commanded position, if the EBV was purposely moved to carry out the diagnosis, and returning any adjusted operating parameters back to pre-diagnosis levels.

Thus, method 400 of FIG. 4 diagnoses an exhaust back-pressure system during movement of the EBV based on a variety of engine operating parameters that may fluctuate as the EBV moves. The diagnosis may be carried out each time the EBV opens or closes or it may be carried out after a threshold amount of time has elapsed. Further, if the threshold amount of time has elapsed and the EBV is not about to change position, the EBV may be purposely moved to perform the diagnosis. When the EBV is closed, whether to strictly heat the catalyst or other engine component or to perform a diagnosis of the valve, operating parameters, such as valve timing and EGR valve position, may be adjusted accordingly to maintain combustion stability during the closure of the valve. Furthermore, in some embodiments, degradation of the exhaust back-pressure system may be determined based on a pressure sensor located upstream of the EBV. If a pressure sensor is present upstream of the EBV, when the EBV closes, degradation may be indicated if the sensed exhaust pressure does not increase. In some examples, a dedicated exhaust pressure sensor may be present to diagnose the EBV. In other examples, an existing pressure sensor may be used, such as a sensor that measures a pressure in the EGR system.

In one embodiment, the methods and systems described herein provide for a method for operating an engine, comprising closing an exhaust back-pressure valve in response to a component temperature; adjusting intake and/or exhaust valve operation in response to closing the exhaust back-pressure valve to reduce cylinder internal EGR; and while the exhaust back-pressure valve is closing, indicating degradation of the exhaust back-pressure valve if a designated engine operating parameter remains constant. The designated engine operating parameter may remain constant if it does not change by more than a threshold amount over a given operating period. The threshold amount may comprise 5% in one example. In another example, the threshold amount may comprise 2%, or it may comprise 10% in an additional example. The given operating period may include the duration over which the exhaust back-pressure valve is closed and/or may include a given period of time after the movement of the valve ceases, such as two seconds in one example, or five seconds in another example. Other threshold amounts of variation and durations of given operating periods are possible.

The component temperature may comprise a temperature of an exhaust aftertreatment device positioned upstream of the exhaust back-pressure valve, and closing the exhaust back-pressure valve in response to the component temperature may further comprise closing the exhaust back-pressure valve in response to the temperature of the exhaust aftertreatment device being below a threshold.

Indicating degradation of the exhaust back-pressure system may further comprise indicating the degradation if intake manifold pressure or throttle position remains constant while the exhaust back-pressure valve closes. The engine may be operating at idle speed, and indicating degradation of the exhaust back-pressure system may further comprise indicating the degradation if the idle speed remains constant while maintaining constant manifold pressure or throttle position as the exhaust back-pressure valve closes.

Indicating degradation of the exhaust back-pressure system may further comprise indicating the degradation if engine air-fuel ratio remains constant while maintaining constant manifold pressure or throttle position as the exhaust back-pressure valve closes. The method may also include where the designated operating parameter is crankshaft acceleration. The method may also include adjusting intake and/or exhaust valve operation by reducing intake and exhaust valve overlap, and further comprising advancing spark timing in response to closing the exhaust back pressure valve.

In another embodiment, a method for an engine comprises during a first condition, operating the engine with a first, higher amount of spark retard and an open exhaust back-pressure valve; and during a second condition, operating the engine with a second, lower amount of spark retard and a closed exhaust back-pressure valve, and as the exhaust back-pressure valve closes, indicating degradation of the exhaust back-pressure system based on a change in manifold pressure.

The first condition may comprise operation at a barometric pressure below a first threshold and the second condition may comprise operation at barometric pressure above the first threshold and catalyst temperature below a second threshold. Indicating degradation of the exhaust back-pressure system based on the change in manifold pressure may further comprise maintaining constant mass air flow and indicating degradation if the manifold pressure does not change.

The second condition may further comprise operation at idle speed, and indicating degradation of the exhaust back-pressure system based on the change in manifold pressure may further comprise maintaining constant idle speed and indicating degradation if the manifold pressure does not change.

The method may further comprise, during the first condition, operating the engine with a first amount of intake and exhaust valve overlap; and during the second condition, operating the engine with a second amount of intake and exhaust valve overlap. The second amount of intake and exhaust valve overlap may comprise no intake and exhaust valve overlap. The method may also further comprise, during the first condition, adjusting an EGR valve to provide a requested EGR amount based on engine speed and load; and during the second condition, closing the EGR valve.

FIG. 6 is a diagram 600 illustrating example engine operating parameters during closure of the EBV, according to an embodiment of the present disclosure. Time is depicted on the horizontal axis, and each respective operating parameter is depicted on the vertical axis. Curve 602 depicts catalyst temperature, curve 604 depicts EBV position, curve 606 depicts spark timing, curve 608 depicts effective EGR rate, and curve 610 depicts torque.

Referring to curve 602, catalyst temperature is depicted. Prior to time $T_1$, the catalyst is below a threshold operating temperature. Following time $T_1$, the EBV is closed, depicted by curve 604. As a result, catalyst temperature starts to increase. Once the catalyst temperature reaches operating temperature, at time $T_2$, the EBV is opened.

Spark timing and effective EGR rate may be adjusted responsive to the closure of the EBV. For example, as depicted by curve 606, spark timing may be retarded from MBT while the catalyst is below operating temperature, to produce excess heat to warm the catalyst. However, to reduce combustion instability that may result when the EBV closes, spark timing may be slightly advanced after time $T_1$. Once the EBV valve opens at time $T_2$, the spark timing may be set to optimal timing for the current conditions, such as MBT. Further, prior to closure of the EBV, the effective EGR rate may reduced as indicated by curve 608, and may be maintained at a minimal amount during the duration of the EBV closure. The effective EGR rate includes both external EGR routed from the exhaust to the intake, and internal EGR trapped in the cylinders due to intake and exhaust valve timing.

Finally, torque may fluctuate during the closure of the EBV, at least initially. As shown by curve 610, following closure of the EBV at time $T_1$, torque initially drops. However, other parameters may be adjusted to compensate for the reduced air flow through the engine, such as throttle position. Thus, torque may resume initial levels after first decreasing. However, as depicted by curve 612, if the EBV is degraded and does not close, torque may remain constant.

It will be appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system, comprising:
an engine including a variable camshaft timing system;
a catalyst positioned in an exhaust of the engine;
an exhaust back-pressure valve positioned downstream of the catalyst; and
a controller including instructions to:
close the exhaust back-pressure valve when a temperature of the catalyst is below a threshold; and
adjust the variable camshaft timing system to reduce intake and exhaust valve overlap responsive to the closing of the exhaust back-pressure valve.

2. The system of claim 1, wherein the controller includes further instructions to advance spark timing responsive to the closing of the exhaust back-pressure valve.

3. The system of claim 1, further comprising an EGR system to route exhaust to an intake of the engine, and wherein the controller includes further instructions to close an EGR valve of the EGR system when the exhaust back-pressure valve is closed.

4. The system of claim 1, wherein the controller includes further instructions to, if the temperature of the catalyst is above the threshold, then open the exhaust back-pressure valve.

5. The system of claim 1, wherein the controller includes instructions to adjust the variable camshaft timing system to reduce positive intake and exhaust valve overlap.

6. The system of claim 1, wherein the controller includes instructions to adjust the variable camshaft timing system to reduce negative intake and exhaust valve overlap.

7. A method for operating an engine, comprising:
throttling a flow of exhaust gas by closing an exhaust back-pressure valve in response to a component temperature; and
adjusting intake and/or exhaust valve operation in response to closing the exhaust back-pressure valve to reduce valve overlap and thereby reduce cylinder internal exhaust gas recirculation (EGR).

8. The method of claim 7, wherein the component temperature comprises a temperature of a catalyst positioned upstream of the exhaust back-pressure valve.

9. The method of claim 7, wherein the component temperature comprises a temperature of the engine.

10. The method of claim 7, wherein closing the exhaust back-pressure valve in response to the component temperature further comprises closing the exhaust back-pressure valve in response to the component temperature being below a threshold.

11. The method of claim 7, further comprising closing an EGR valve prior to closing the exhaust back-pressure valve.

12. The method of claim 7, further comprising advancing spark timing in response to closing the exhaust back-pressure valve.

13. A method for an engine, comprising:
during a first condition, operating the engine by combusting fuel with a first, higher amount of spark retard and allowing exhaust flow with an open exhaust back-pressure valve; and
during a second condition, advancing spark timing by operating the engine by combusting fuel with a second, lower amount of spark retard and throttling exhaust flow with a closed exhaust back-pressure valve.

14. The method of claim 13, wherein the first condition comprises catalyst temperature above a threshold and the second condition comprises catalyst temperature below the threshold.

15. The method of claim 14, wherein the second condition further comprises stable combustion conditions.

16. The method of claim 13, wherein the first condition comprises operation at barometric pressure below a threshold and wherein the second condition comprises operation at barometric pressure above the threshold.

17. The method of claim 13, further comprising:
during the first condition, operating the engine with a first amount of intake and exhaust valve overlap; and
during the second condition, operating the engine with a second amount of intake and exhaust valve overlap.

18. The method of claim 17, wherein the second amount of intake and exhaust valve overlap comprises no intake and exhaust valve overlap.

19. The method of claim 13, further comprising:
during the first condition, adjusting an EGR valve to provide a requested EGR amount based on engine speed and load; and
during the second condition, closing the EGR valve.

* * * * *